United States Patent [19]

Lukas

[11] Patent Number: 4,570,372
[45] Date of Patent: Feb. 18, 1986

[54] EARTHWORM HARVESTING METHOD

[75] Inventor: Peter Lukas, Toronto, Canada

[73] Assignee: P.M. Sports Development Limited, Mississauga, Canada

[21] Appl. No.: 610,374

[22] Filed: May 15, 1984

[30] Foreign Application Priority Data

May 17, 1983 [GB] United Kingdom ............... 8313621

[51] Int. Cl.$^4$ ............................................. A01K 97/00
[52] U.S. Cl. ......................................................... 43/1
[58] Field of Search ........................... 43/1, 4; 424/149

[56] References Cited

U.S. PATENT DOCUMENTS

| | | | |
|---|---|---|---|
| 1,446,914 | 2/1923 | Lingafelter et al. | 43/1 |
| 1,932,237 | 10/1933 | Warner | 43/1 |
| 2,607,164 | 8/1952 | Fenton | 43/1 |
| 3,073,284 | 1/1963 | Roberts | 43/1 |
| 3,239,413 | 3/1966 | Chaney | 43/1 X |
| 4,178,711 | 12/1979 | Mermal et al. | 43/1 |

OTHER PUBLICATIONS

Pharmacological Aspects of Juglone, by T. K. Auyong et al., Toxicon, vol. 1, pp. 235–239, 1963.

*Primary Examiner*—Kuang Y. Lin
*Assistant Examiner*—M. Jordan
*Attorney, Agent, or Firm*—Arne I. Fors; Robert F. Delbridge

[57] ABSTRACT

A method of harvesting worms from ground soil includes forming a solution containing about 12 to 30 ppm chlorine in water by dissolving a solid tablet containing by weight about 1 to 10% sodium sulphate and the balance a metal oxychloride in water, pouring the solution on ground soil containing worms causing the worms to emerge from the ground, and collecting the worms.

8 Claims, No Drawings

EARTHWORM HARVESTING METHOD

This invention relates to a method of harvesting earthworms from a ground soil area and to a chemical composition which is effective to encourage earthworms to surface from their burrows while obviating injury to the worms or damage to plant life.

Earthworms conventionally are harvested at night when they emerge from their burrows to move about on the ground surface. Gardens and grass-covered areas such as lawns and meadows usually contain an abundant supply of earthworms. The earthworms are picked, packed and refrigerated and then distributed to various outlets for sale and use primarily as fish bait.

In that worms are nocturnal creatures, harvesting of worms normally must take place at night. Attempts have been made for the commercial harvesting of earthworms during daylight hours by means of the use of an electrical current established in the ground between two electrodes to create a pulsating charge at a predetermined frequency to cause the earthworms to surface. This technique necessitates a high initial capital cost and access to a power supply. In addition, an inexperienced operator is exposed to the hazards of an electrical shock.

The use of chemical solutions to impregnate ground soil and force earthworms to the surface is known. U.S. Pat. No. 1,446,914 issued Feb. 27, 1923 discloses the application of a lime-sulphur solution containing calcium polysulfide diluted by water to the soil to force earthworms to the surface. U.S. Pat. No. 3,239,413 issued Mar. 8, 1966 discloses a worm lure composition" consisting essentially of potassium dichloro-isocyanurate as a chlorine-producing compound preferably together with alkyl aryl sulfonate as a wetting agent and anhydrous sodium tripolyphosphate as a filler. The rate of dissolution of potassium dichloro-isocyanurate in water is difficult to control and can vary ±200%, necessitating the washing of harvested worms and often resulting in the death of the worms within a few days if the dichloro-isocyanurate content in the water is excessive. U.S. Pat. No. 4,178,711 discloses an aqueous worm harvesting composition containing husks of walnuts mixed with water which is applied to a ground surface area.

I have found a method of harvesting earthworms which comprises controllably wetting ground soil containing earthworms with an aqueous solution containing free chlorine derived from solid oxychloride (hypochlorite) of various metals alone or with extract of cedar in a concentration sufficient to encourage earthworms to leave their burrows and surface during daylight hours but in a concentration insufficient to injure the earthworms or to damage plant life such as grass or shrubs. A concentration of free chlorine in water in an amount of about 12 to 30 parts per million (ppm) derived from tablets of the oxychloride has been found satisfactory to cause earthworms to surface while causing no injury or damage to worms or to plant life.

The method of my invention for harvesting worms from ground soil comprises in its broad aspect forming a solution containing about 12 to 30 ppm chlorine in water by dissolving a solid tablet containing about 1 to 10% by weight sodium sulphate and the balance a metal oxychloride in water, pouring said solution on ground soil containing worms causing said worms to emerge from the ground, and collecting said worms.

The solution can be formed and poured on the ground soil by placing a said tablet in a pail or plastic bag, preferably about 4 liters in capacity, and continually flowing water at a rate of about 15 to 25 liters per hour into said pail or bag for 25 to 40 minutes such that the resulting solution continually pours onto the ground soil surrounding the vessel. Alternatively, the solution can be formed and poured on the ground soil by placing a said tablet in a 4 liter pail or plastic bag, adding water and stirring the tablet in the water for about 2 to 4 minutes, and pouring the resulting solution on the ground soil containing worms.

Preferably, the method of my invention additionally includes dissolving a solid tablet containing about 15 to 30% extract of cedar and the remainder sodium sulphate.

Solid oxychlorides of various metals provide a controlled release of free chlorine which functions suitably as a mild irritant. However, the relative instability of most oxychlorides poses a potential handling or storage hazard to users. Also, solid oxychlorides are dense and difficult to dissolve. Tablets containing a mixture of a metal oxychloride such as lithium oxychloride and a soluble carrier ingredient such as sodium sulphate permits a controlled release of a desired concentration of earthworm irritant when dissolved in water.

I have found that a solid tablet of lithium oxychloride containing about 1–12% by weight sodium sulphate provides a controlled release of ±5% free chlorine irrespective of water temperature within the range of about 12–30 ppm free chlorine when dissolved in water. The use of less than 1% of sodium sulphate in the compound resulted in a slow release of chlorine which was ineffective. The use of 15% of sodium sulphate in the compound resulted in a release of 50–60 ppm chlorine in 10 minutes which was harmful to the earthworms harvested.

Tablets containing lithium oxychloride having 34.3% available chlorine mixed with 2% by weight of an inert carrier ingredient sodium sulphate and pressed into tablets having a weight of 9 to 12 grams conveniently provided a controlled supply of free chlorine.

Extract of cedar, which can be composed of gummy resins, wood bi-products, esters and/or ketones, aslo functions as a mild irritant to cause worms to surface. The extract of cedar can be mixed with sodium sulphate in an amount of 0.1 to 0.3 g of the extract with 0.25 to 1.5 g of the sodium sulphate for controlled dissolution of the extract of cedar in water. The combination of one tablet containing lithium oxychloride and sodium sulphate and a second tablet containing extract of cedar and sodium sulphate, having the compositions discussed above, dissolved together in water provided a surprisingly effective solution for the harvesting of worms. Field tests have been conducted on the combination of a 9 g lithium oxychloride tablet and a 0.25 gm extract of cedar tablet, both containing sodium sulphate, dissolved together in water. The tablets were placed in a pail and water introduced to the pail by a garden hose such that water containing dissolved chemicals spilled over the rim of the pail onto the surrounding ground containing earthworms. The addition of water at a rate of about 15 to about 25 liters per hour, an average flow rate from a garden hose, to a 4 liter pail provided a release of about 12 to about 30 ppm free chlorine and a desired amount of extract of cedar. The use of less than about 10 ppm free chlorine results in little, if any, surfacing of the earthworms and the use of more than about 30 ppm free chlorine results in damage to the earthworms.

The lithium oxychloride oxidizes to a harmless lithium chloride salt with no adverse effects on the soil, plant life or animal life. Areas harvested continually for four years during experimental tests showed no reduction of the worm population and no environmental damage. No mutations or other genetic damage to the worms was observed.

What I claim as new and desire to protect by Letters Patent of the United States is:

1. A method of harvesting worms from ground soil which comprises:
    forming a solution containing about 12 to 30 ppm chlorine in water by dissolving a solid tablet containing by weight about 1 to 10% sodium sulphate and the balance a metal oxychloride in water;
    pouring said solution on ground soil containing worms causing said worms to emerge from the ground; and collecting said worms.

2. A method as claimed in claim 1 in which said tablet is placed in a pail or plastic bag and water is continually introduced into said pail or plastic bag and caused to pour onto the ground soil surrounding said pail or plastic bag at a rate in the range of about 15 to 25 liters per hour.

3. A method as claimed in claim 1 in which said tablet is placed in a pail or plastic bag, stirred in water for about 2 to 4 minutes, and the resulting solution spread over the ground soil.

4. A method as claimed in claim 2 in which said metal oxychloride is lithium oxychloride.

5. A method as claimed in claim 1 in which said solution is formed by additionally dissolving in said water a solid tablet containing by weight about 15 to 30% extract of cedar and the remainder sodium sulphate.

6. A method as claimed in claim 5 in which said tablets are placed in a pail or plastic bag and water is continually introduced into said pail or plastic bag and caused to pour onto the ground soil surrounding said pail or plastic bag at a rate in the range of about 15 to 25 liters per hour.

7. A method as claimed in claim 5 in which said tablets are placed in a pail or plastic bag, stirred in water for about 2 to 4 minutes, and the resulting solution spread over the ground soil.

8. A method as claimed in claim 1 in which said solid tablet contains by weight about 2% sodium sulphate and the remainder lithium oxychloride.

* * * * *